United States Patent [19]

Fraidlin

[11] Patent Number: 5,258,901
[45] Date of Patent: Nov. 2, 1993

[54] HOLDOVER CIRCUIT FOR AC-TO-DC CONVERTERS

[75] Inventor: Simon Fraidlin, Plano, Tex.

[73] Assignee: AT&T Bell Laboratories, Murray Hill, N.J.

[21] Appl. No.: 857,527

[22] Filed: Mar. 25, 1992

[51] Int. Cl.$^5$ .............................................. H02J 9/00
[52] U.S. Cl. ...................................... 363/15; 307/64; 363/37; 363/89
[58] Field of Search ............... 363/15, 16, 81, 89, 363/37, 44, 46; 323/222; 307/64

[56] References Cited

U.S. PATENT DOCUMENTS

| | | | |
|---|---|---|---|
| 4,533,986 | 8/1985 | Jones | 363/17 |
| 4,683,529 | 7/1987 | Bucher | 363/44 |
| 4,795,914 | 1/1989 | Higa et al. | 307/64 |
| 4,827,151 | 5/1989 | Okado | 307/66 |
| 4,940,929 | 7/1990 | Williams | 323/222 |
| 5,115,185 | 5/1992 | Fraidlin et al. | 323/207 |
| 5,170,070 | 12/1992 | Hattori et al. | 307/64 |

OTHER PUBLICATIONS

"A resonance Power Supply that Provides Dynamic Power Factor Correction in Capacitor Input Off-Line Converters" by Amarasinghe & Manning, APEC '90 Conf Proc, Mar. 1990, pp. 563–570.

"Optimal Topologies of Resonant DC/DC Converters" by Kazimierczuk & Zwik, *IEEE Transactions on Aerospace and Electronic Systems*, May 1989, p. 364.

B. A. Miwa, D. M. Otten and M. F. Schlecht, "High Efficiency Power Factor Correction Using Interleaving Techniques", IEEE, (1992), pp. 557–568.

*Primary Examiner*—William H. Beha, Jr.
*Attorney, Agent, or Firm*—Alfred G. Steinmetz

[57] ABSTRACT

Holdover circuitry for an off line switcher, including a DC-to-DC converter, maximizes holdover time, during source voltage failures, by commutating a precharged holdover capacitor to the input of a power factor correcting preregulator. This limits the size of the holdover capacitor required without any loss in holdover time. Reduction in the size of the required holdover capacitor required for a desired holdover time improves volumetric efficiency of the off line switcher. This arrangement further improves efficiency of the DC-to-DC converter and decreases stress on its components by narrowing the input voltage range requirement.

6 Claims, 3 Drawing Sheets

HOLDOVER CIRCUIT FOR AC-TO-DC CONVERTERS

FIELD OF THE INVENTION

This invention relates to a method and apparatus for providing extended holdover capability for AC-to-DC converters. It is particularly concerned with a converter having power factor correction capability and which is operated off of an AC power line.

BACKGROUND OF THE INVENTION

Power converters operating off an AC line generally have holdover capacitors to serve as a holdover energy source allowing a converter to operate for some time after the AC line voltage is interrupted. These capacitors are charged via direct rectification of the input AC voltage or they are charged via a power factor correcting preregulator. The voltage developed across these capacitors is then processed by a DC-to-DC converter. With a given capability of a DC-to-DC converter to operate over the range of input voltages, the capacitor size determines the holdover time; the time for which the capacitor's voltage is still within the operating range of the DC-to-DC converter.

Typically a compromise must be made between the size of the holdover capacitor and the desired holdover time. A large capacitor, which has a greater energy storage, increases the holdover time, but it also increases the expense and the overall size of the converter, and allowable cost and space may be limited in many applications. On the other hand a small capacitor may not have a sufficient energy storage capacity to provide a desired holdover time.

Even with a large holdover capacitor only a fraction of the stored energy is available to the DC-to-DC converter. Increases in the operational input voltage range of a DC-to-DC converter is not always feasible due to additional stress and dissipation in the converter caused by the wider input voltage range requirement.

SUMMARY OF THE INVENTION

Holdover circuitry for an off line switcher maximizes holdover time, during source voltage interruptions, by commutating a holdover capacitor to the input of the power factor correcting preregulator. Operation of the power factor correcting preregulator removes all the energy stored in a holdover capacitor while maintaining the input voltage of the DC-to-DC converter within the operating range. Since all the energy stored in the holdover capacitor is recoverable, the size of the holdover capacitor required is much smaller without incurring any loss in holdover time thus improving the volumetric efficiency of the off line switcher.

DETAILED DESCRIPTION

Figure 1:
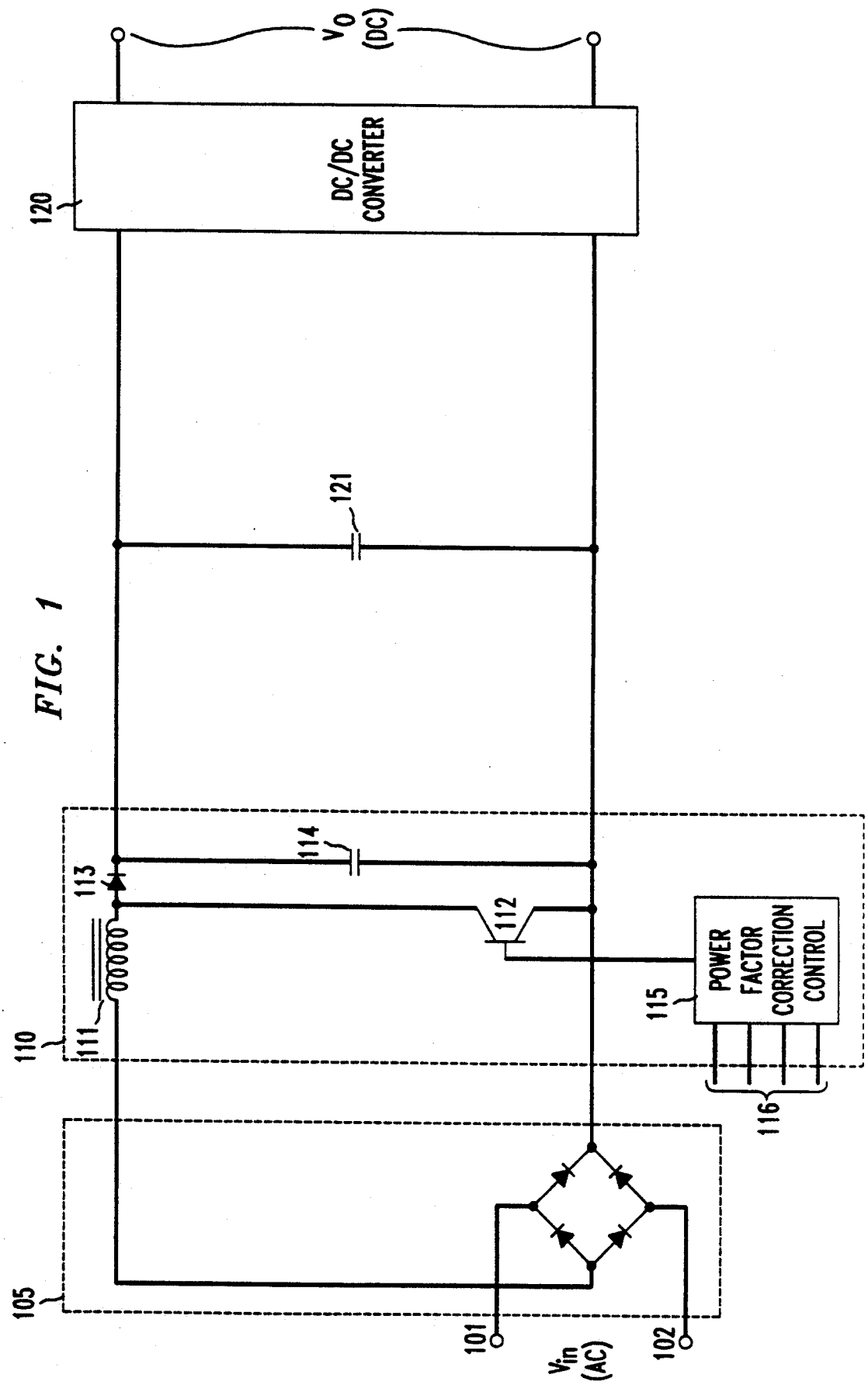
FIG. 1 is a schematic of a power supply powered off of an AC power line.

A power supply powered off of an AC power line and typical of the prior art is shown in the FIG. 1. An AC power line is connected to the input terminals 101 and 102 of a full wave bridge rectifier 105. The rectified voltage output of rectifier 105 is connected to a boost converter 110.

Boost converter 110 includes an inductor 111, a power modulating transistor switch 112 and a steering diode 113. The transistor switch 112 is periodically modulated in such a way as to maintain input AC current through the 101 and 102 terminals in phase and proportional to the input AC line voltage (for the purpose of maintaining high power factor), and to regulate the voltage at the output of the boost converter at a predetermined level. The modulating transistor switch 112 is driven by a power factor correction circuit 115. Power factor correction circuit 115 establishes and maintains a proper controlled drive, according to some defined algorithm, for the switch 112 in response to signals representing input and output voltages, and currents via sense leads indicated by the leads 116. Circuitry to provide this drive function is well known and it is not believed necessary to disclose it in detail.

The output of the boost converter 110 is applied to the input of a DC-to-DC power converter 120. A voltage storage capacitor 121 is connected across the input terminals of the DC-to-DC power converter 120. Capacitor 121 is a bulk capacitor for storing and supplying holdover energy to the DC-to-DC converter in the event of a failure or brownout of the AC voltage applied to input terminals 101 and 102.

This arrangement is limited in the amount of holdover time it can provide suitable input voltage to the converter 120 which permits the converter to maintain is normal voltage output. A limited input voltage range of a DC-to-DC converter allows it to utilize only a portion of the total energy stored in the capacitor 121. Increasing the input voltage range at which the converter can maintain its normal output requires a converter design that is sub optimal with respect to efficiency of operation and/or component stress. An increase in the physical size of the capacitor 121 can significantly increase holdover time, however, this causes significant degradation of the volumetric efficiency of the converter.

Figure 2:
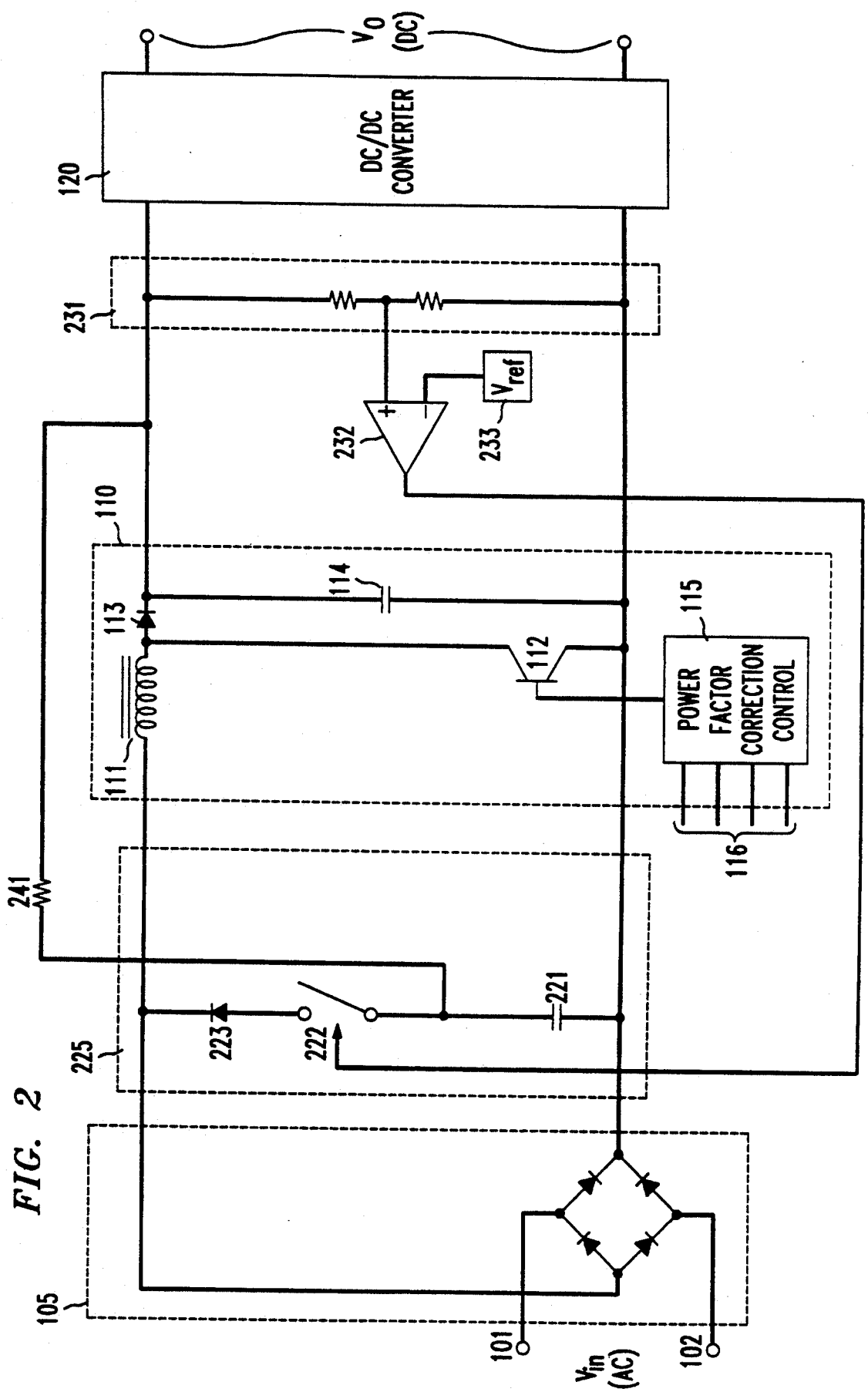
FIG. 2 is a schematic of a power supply powered off of an AC power line and having a voltage holdover circuit embodying the principles of the invention.

An alternative arrangement for increasing the holdover time without increasing capacitor size is shown in the FIG. 2. A holdover capacitor 221 is connected in a series circuit arrangement 225 which is connected across the output of the bridge rectifier 105. A controllable switch 222 and a diode 223 connected in series with the capacitor 221 complete the series circuit arrangement 225. If the switch 222 is able to interrupt current in both directions, the diode 223 may be dispensed with.

The switch 222 is controlled by a comparator amplifier 231 and is normally open when input voltage to the DC-to-DC converter 120 is satisfactory. Capacitor 221 is charged by the output of the boost converter 110, via a high resistive impedance 226, during normal operation with a satisfactory AC input voltage.

Comparator amplifier 232 is connected to a voltage divider 231 connected across the power input to the converter 120. The divided voltage is compared to a reference voltage 233. When the AC input voltage fails, the drop in the divided voltage causes the comparator amplifier output to close the switch 222 and connect the capacitor to the boost converter input, via the now forward biased diode 223.

The action of the boost converter 110 allows all of the stored charge on the capacitor 221 to be usable to supply operative voltage to the input of the DC-to-DC converter 120. This arrangement allows for a vastly increased holdover time without a corresponding increase in the size of the holdover capacitor. This permits the converter 120 to operate over a narrower voltage range and hence the converter may operate with higher efficiency and with reduced voltage stress on the circuit components.

Figure 3:
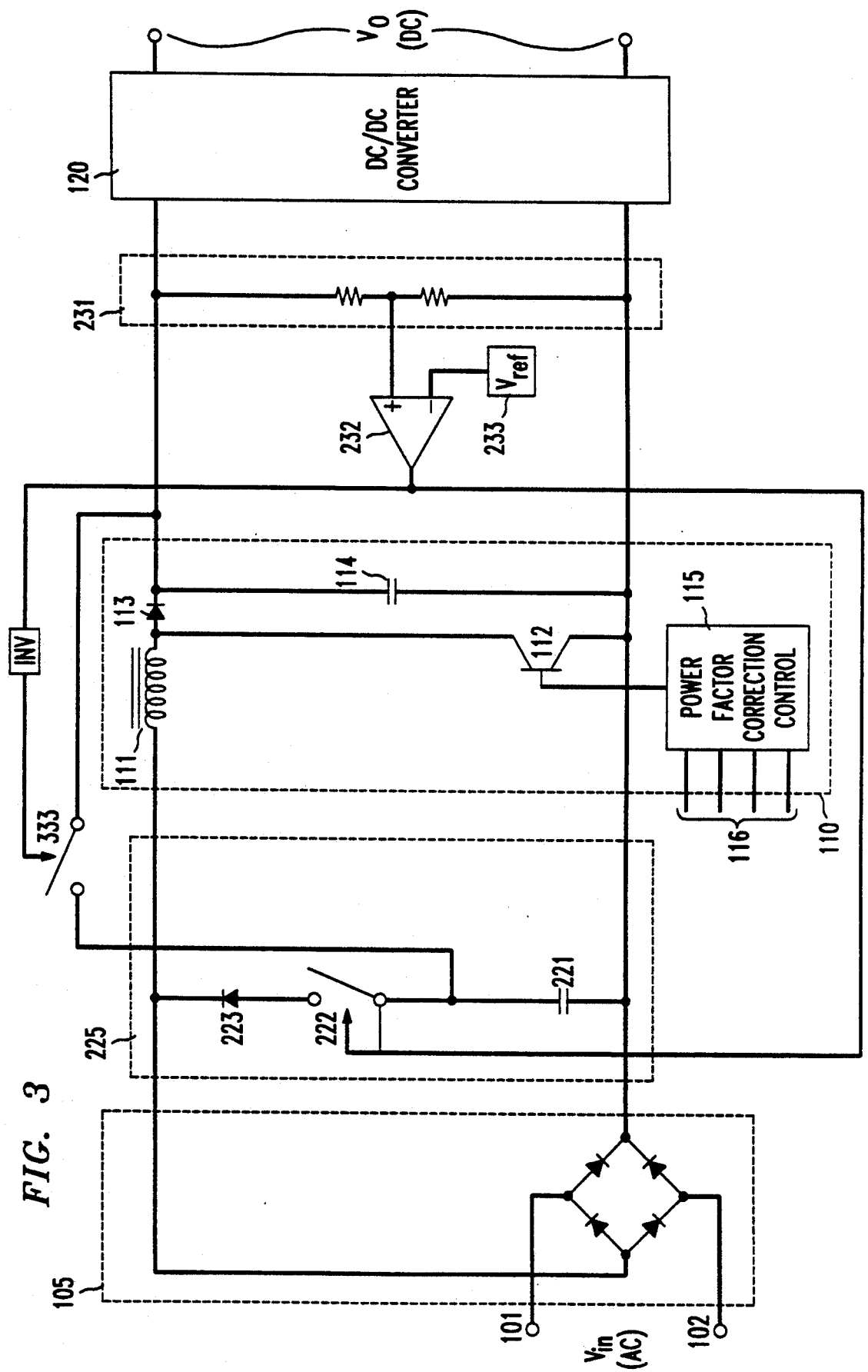
FIG. 3 is a schematic of a power supply powered off of an AC power line and having another voltage holdover circuit embodying the principles of the invention.

Another arrangement for providing holdover voltage to a converter is shown in FIG. 3. As shown the voltage storage capacitor 221 is connected to be charged by the output of the boost converter 110 through a controlled switch 333. The switch 333 is responsive to the comparator amplifier 232 as is the switch 222. The switch bias is arranged so that the switches 222 and 333 are conductive in the alternative to one another. When switch 222 conducts the switch 333 is nonconductive and vice versa. This arrangement allows the two capacitors 221 and 114 to be connected in parallel during normal operation of the converter when the input AC is at normal value. This permits ripple stress to be shared by both capacitors and allows the size and cost of the capacitor 114 to be minimized. It also allows for a more rapid response to the failure of input AC voltage as detected by comparator amplifier 232, due to a decrease in the amplitude of the line frequency ripple across the divider 231.

I claim:

1. An off line power converter, comprising:
   an input rectifier for rectifying an applied AC line voltage;
   a power factor correction converter having a first input connected to receive a rectified voltage supplied by the input rectifier;
   a DC-to-DC power converter having a second input connected to receive a voltage output of the power factor correction converter;
   holdover circuitry for providing voltage to the second input in response to a failure of the applied AC line voltage to permit continued operation of the DC-to-DC power converter;
   the holdover circuitry comprising:
   a series circuit connected across the first input including a first voltage storage capacitor and a first controllable switch,
   the first controllable switch operative in an open mode to prevent charging of the the first voltage storage capacitor directly by the input rectifier;
   a second voltage storage capacitor connected across the second input;
   a second controllable switch in a closed mode connecting the first voltage storage capacitor to the second voltage storage capacitor so that charge on the second voltage capacitor flows to the first voltage storage capacitor; and
   control means to open the second switch and to close the first switch to connect the first and second voltage storage capacitors in parallel upon occurrence of a failure of the input AC line voltage.

2. An off line power converter, comprising:
   an input rectifier for rectifying an applied AC line voltage;
   a power factor correction converter having a first input connected to receive a rectified voltage supplied by the input rectifier;
   a DC-to-DC power converter having a second input connected to receive a voltage output of the power factor correction converter;
   holdover circuitry for providing voltage to the second input in response to a failure of the applied AC line voltage to permit continued operation of the DC-to-DC power converter;
   the holdover circuitry comprising
   a series circuit connected across the first input including a diode, a first voltage storage capacitor and a first switch connecting the diode to the first voltage storage capacitor;
   the diode oriented in conductive direction to prevent charging of the first storage capacitor;
   a second voltage storage capacitor connected across the second input;
   a second switch connecting the first voltage storage capacitor to the second voltage storage capacitor so that charge on the second voltage capacitor flows to the first voltage storage capacitor; and
   control means to open the second switch and close the first switch to connect the first and second voltage storage capacitors in parallel upon occurrence of a failure of the input AC line voltage.

3. An off line power converter as claimed in claim 1 or 2, comprising:
   the control means including a comparator connected to sense an input voltage of the DC-to-DC power converter.

4. An off line power converter, comprising:
   an input rectifier for rectifying an applied AC line voltage;
   a power factor correction converter having a first input connected to receive a rectified voltage supplied by the input rectifier;
   a DC-to-DC power converter having a second input connected to receive a voltage output of the power factor correction converter;
   holdover circuitry for providing voltage to the second input in response to a failure of the applied AC line voltage to permit continued operation of the DC-to-DC power converter;
   the holdover circuitry comprising:
   a series circuit connected across the first input including, a first voltage storage capacitor and a first controllable switch;
   the first controllable switch operative in an open mode to prevent direct charging of the first voltage storage capacitor by the input rectifier;
   a second voltage storage capacitor connected across the second input;
   a second switch connecting the first voltage storage capacitor to the second voltage storage capacitor so that with the second switch closed charge on the second voltage capacitor trickles to the first voltage storage capacitor; and
   control means to close the first switch to connect the first voltage storage capacitor to an input of the boost converter and connect the first and second voltage storage capacitors in parallel upon occurrence of a failure of the input AC line voltage and open the second switch to disconnect the first capacitor from an output of the power factor correction converter.

5. An off line power converter, comprising:

an input rectifier for rectifying an applied AC line voltage;

a power factor correction converter having a first input connected to receive a rectified voltage supplied by the input rectifier;

a DC-to-DC power converter having a second input connected to receive a voltage output of the power factor correction converter;

holdover circuitry for providing voltage to the second input in response to a failure of the applied AC line voltage to permit continued operation of the DC-to-DC power converter;

the holdover circuitry comprising:

a series circuit connected across the first input including a diode, a first voltage storage capacitor and a first switch connecting the diode to the first voltage storage capacitor;

the diode oriented in conductive direction to prevent charging of the the first voltage storage capacitor;

a second voltage storage capacitor connected across the second input;

a second switch connecting the first voltage storage capacitor to the second voltage storage capacitor so that charge on the second voltage capacitor trickles to the first voltage storage capacitor; and control means to close the first switch to connect the first voltage storage capacitor to an input of the boost converter and connect the first and second voltage storage capacitors in parallel upon occurrence of a failure of the input AC line voltage and open the second switch to disconnect the first capacitor from an output of the power factor correction converter.

6. An off line power converter as claimed in claim 4 or 5, comprising:

the control means including a comparator connected to sense an input voltage of the DC-to-DC power converter.

* * * * *